US009642123B2

(12) United States Patent
Quan et al.

(10) Patent No.: US 9,642,123 B2
(45) Date of Patent: May 2, 2017

(54) DATA TRANSMISSION METHOD, BASE STATION AND USER EQUIPMENT

(71) Applicant: Huawei Technologies Co., Ltd., Shenzhen, Guangdong (CN)

(72) Inventors: Wei Quan, Shenzhen (CN); Yuhua Chen, Shenzhen (CN); Kunpeng Liu, Shenzhen (CN); Jianghua Liu, Shenzhen (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 14/460,947

(22) Filed: Aug. 15, 2014

(65) Prior Publication Data

US 2015/0009936 A1 Jan. 8, 2015

Related U.S. Application Data

(63) Continuation of application No. PCT/CN2013/071622, filed on Feb. 17, 2013.

(30) Foreign Application Priority Data

Feb. 17, 2012 (CN) .......................... 2012 1 0037128

(51) Int. Cl.
*H04W 72/04* (2009.01)
*H04L 5/00* (2006.01)
(Continued)

(52) U.S. Cl.
CPC .......... *H04W 72/0413* (2013.01); *H04L 1/18* (2013.01); *H04L 5/0055* (2013.01);
(Continued)

(58) Field of Classification Search
None
See application file for complete search history.

(56) References Cited

U.S. PATENT DOCUMENTS 7,352,735 B1 4/2008 Hayashi
2008/0273482 A1* 11/2008 Lee ..................... H04W 72/005
370/312
(Continued)

FOREIGN PATENT DOCUMENTS

AU 2011204876 A1 8/2011
CN 101193421 A 6/2008
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 9)," 3GPP TS 36.321, V9.5.0, pp. 1-48, 3rd Generation Partnership Project, Valbonne, France (Dec. 2011).
(Continued)

*Primary Examiner* — Kodzovi Acolatse
(74) *Attorney, Agent, or Firm* — Leydig, Voit & Mayer, Ltd.

(57) ABSTRACT

Embodiments of the present invention provide a data transmission method, a base station and a user equipment. One transmission method includes: sending, by a base station, first data and random access information to a user equipment UE simultaneously; and acquiring, by the base station, receiving state information of the first data fed back by the UE through the random access information. Another transmission method includes: receiving, by a user equipment, UE, first data and random access information sent by a base station simultaneously; and feeding back, by the UE, receiving state information of the first data to the base station through the random access information. In the technical
(Continued)

A base station sends first data and random access information to a user equipment UE simultaneously — 101

The base station acquires receiving state information of the first data, where the receiving state information is fed back by the UE through the random access information — 102 solutions of the present invention, a base station transmits data to a UE during a random access process, thereby reducing signaling interaction and time delay and improving the data transmission efficiency.

20 Claims, 4 Drawing Sheets

(51) Int. Cl.
  *H04W 74/08* (2009.01)
  *H04L 1/18* (2006.01)
  *H04W 74/00* (2009.01)
  *H04W 72/12* (2009.01)

(52) U.S. Cl.
  CPC ..... *H04W 74/008* (2013.01); *H04W 74/0833* (2013.01); *H04W 72/1289* (2013.01)

(56) References Cited

U.S. PATENT DOCUMENTS

| | | | |
|---|---|---|---|
| 2010/0035581 A1* | 2/2010 | Park | H04W 74/08 455/412.1 |
| 2010/0226263 A1* | 9/2010 | Chun | H04L 1/0026 370/252 |
| 2010/0309836 A1* | 12/2010 | Sugawara | H04W 72/1231 370/312 |
| 2010/0309929 A1 | 12/2010 | Gao et al. | |
| 2011/0038361 A1 | 2/2011 | Park et al. | |
| 2011/0317648 A1 | 12/2011 | Lee et al. | |
| 2012/0002643 A1* | 1/2012 | Chung | H04J 11/0093 370/331 |
| 2013/0294388 A1 | 11/2013 | Kawasaki et al. | |
| 2013/0308573 A1 | 11/2013 | Kuroda | |
| 2014/0169304 A1 | 6/2014 | Digirolamo et al. | |
| 2014/0241265 A1* | 8/2014 | Pragada | H04W 72/04 370/329 |
| 2015/0312899 A1 | 10/2015 | Yamada et al. | |
| 2015/0319785 A1 | 11/2015 | Kato et al. | |

FOREIGN PATENT DOCUMENTS

| | | |
|---|---|---|
| CN | 101448313 A | 6/2009 |
| CN | 101478778 A | 7/2009 |
| CN | 101873707 A | 10/2010 |
| CN | 102231917 A | 11/2011 |
| JP | 2001333067 A | 11/2001 |
| JP | 2010502120 A | 1/2010 |
| JP | 2010506537 A | 2/2010 |
| JP | 2010507978 A | 3/2010 |
| JP | 2011509581 A | 3/2011 |
| WO | WO 2007052753 A1 | 5/2007 |
| WO | WO 2008024788 A2 | 2/2008 |
| WO | WO 2008045471 A1 | 4/2008 |
| WO | WO 2008153078 A1 | 12/2008 |
| WO | WO 2009092266 A1 | 7/2009 |
| WO | WO 2012017841 A1 | 2/2012 |
| WO | WO 2012108045 A1 | 8/2012 |

OTHER PUBLICATIONS

"3$^{rd}$ Generation Partnership Project; Technical Specification Group Radio Access Network; Evolved Universal Terrestrial Radio Access (E-UTRA); Medium Access Control (MAC) protocol specification (Release 10)," 3GPP TS 36.321, V10.4.0, pp. 1-17, 3$^{rd}$ Generation Partnership Project, Valbonne, France (Dec. 2011).

* cited by examiner

DATA TRANSMISSION METHOD, BASE STATION AND USER EQUIPMENT

CROSS-REFERENCE TO RELATED APPLICATIONS

The present application is a continuation of International Patent Application No. PCT/CN2013/071622, filed on Feb. 17, 2013, which claims priority to Chinese Patent Application No. 201210037128.6, filed on Feb. 17, 2012, both of which are hereby incorporated by reference in their entireties.

TECHNICAL FIELD

The present invention relates to mobile communication technologies and, in particular, to a data transmission method, a base station and a user equipment.

BACKGROUND

Currently, in applications of M2M or a smart phone, there will be transmissions for a small packet service usually, for example, background programs of a smart phone usually initiate a small packet service, the service feature of which is small data amount each time, generally less than 200 bytes, and being transmitted at a periodic or an irregular given moment.

If a user equipment (UE) is in RRC connection state currently, but the uplink is out of sync, at this time if a base station (Node B) has a small packet service requiring downlink transmission, then usually the UE is required to perform a non-contention based random access, after the uplink being in sync, the base station can perform transmission for a downlink small packet service then. Since the small packet service has a very small data amount, while the random access process incurs great resource consumption and time delay, thereby resulting in relative low transmission efficiency for the small packet service.

SUMMARY

The present invention provides a data transmission method, a base station and a user equipment so as to improve data transmission efficiency.

In one aspect, the present invention provides a data transmission method, including:
  sending, by a base station, first data and random access information to a user equipment, UE, simultaneously; and
  acquiring, by the base station, receiving state information of the first data, where the receiving state information is fed back by the UE through the random access information.

In one aspect, the present invention provides a base station, including
  a first sending module, configured to send first data and random access information to a user equipment, UE, simultaneously; and
  an acquiring module, configured to acquire receiving state information of the first data, where the receiving state information is fed back by the UE through the random access information.

In another aspect, the present invention provides a data transmission method, including:

receiving, by a user equipment, UE, first data and random access information sent by a base station simultaneously; and
  feeding back, by the UE, receiving state information of the first data to the base station through the random access information.

In another aspect, the present invention provides a user equipment, including:
  a first receiving module, configured to receive first data and random access information sent by a base station simultaneously;
  a feedback module, configured to feed back receiving state information of the first data to the base station through the random access information.

The present invention provides a data transmission method and a base station in one aspect, the base station sends first data and random access information to a UE simultaneously, and the UE feeds back to the base station through the random access information whether the first data are received successfully, so that the UE can receive the first data issued by the base station during a random access procedure or prior to a random access procedure, rather than as the prior art where service data issued by the base station can be received only after a random access procedure, thereby data transmission efficiency is improved.

The present invention provides a data transmission method and a user equipment in another aspect, the UE receives first data and random access information sent by a base station simultaneously, and feeds back to the base station, through the random access information, receiving state of the first piece of data, which achieves that the service data issued by the base station are received during a random access procedure or prior to a random access procedure, rather than as the prior art where service data issued by the base station can only be received after a successful random access, thereby data transmission efficiency is improved.

BRIEF DESCRIPTION OF DRAWINGS

In order to make technical solutions in embodiments of the present invention or in the prior art more clearly, the accompanying drawings used for description of the embodiments or the prior art are briefly described hereunder. Obviously, the described drawings are merely some embodiments of present invention. For persons skilled in the art, other drawings may be obtained based on these drawings without any creative efforts.

DESCRIPTION OF EMBODIMENTS

In order to make the objectives, technical solutions, and advantages of embodiments of the present invention more clearly, the technical solutions in embodiments of the present invention are hereinafter described clearly and completely with reference to the accompanying drawings in embodiments of the present invention. Obviously, the described embodiments are a part of embodiments of the present invention, rather than all embodiments of the present invention. All the other embodiments obtained by persons of ordinary skill in the art based on embodiments of the present invention without any creative efforts shall fall within the protection scope of the present invention.

Figure 1:
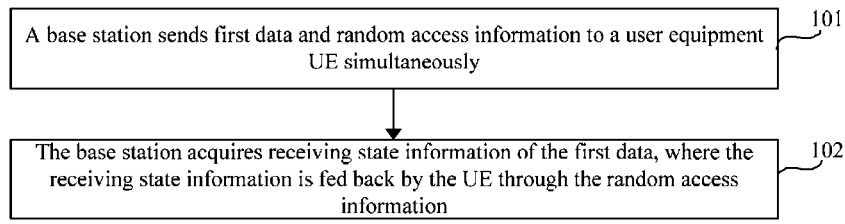
FIG. 1 is a flow chart of a data transmission method provided by an embodiment of the present invention.

FIG. 1 is a flow chart of a data transmission method provided by an embodiment of the present invention. As shown in FIG. 1, the method of this embodiment includes:

Step 101, a base station sends first data and random access information to a user equipment, UE, simultaneously.

Step 102, the base station acquires receiving state information of the first data, where the receiving state information is fed back by the UE through the random access information.

In this embodiment, if the UE has already been in a state of uplink out of sync, but when the base station has services needed to be downlink transmitted, the base station can send data needed to be sent (i.e. the first data) and the random access information to the UE simultaneously.

The first data can be data of a data radio bearer (DRB), and can also be data of a signaling radio bearer (SRB). The data of the SRB, for example, can be a radio resource control protocol (Radio Resource Control, RRC) release message.

The random access information, in one aspect, is configured to trigger the UE to perform a non-contention based uplink random access, in another aspect acts as a carrier of the receiving state information of the first data fed back by the UE to the base station, i.e. used for the UE to feed back to the base station whether the first data is received successfully.

As for the UE, the UE will receive the first data and the random access information sent by the base station simultaneously. If the UE succeeds in receiving the random access information, the UE performs a non-contention based random access procedure through the random access information, i.e. sends a preamble to the base station on a physical random access channel (PRACH) resource. Meanwhile, the UE feeds back to the base station through the random access information, information on whether the first data is received successfully. If the UE also succeeds in receiving the first data, then the UE will feed back, to the base station, information that the first data is received successfully; if the UE fails to receive the first data, then the UE will return information to the base station that the first data is received unsuccessfully.

There may be many manners for the UE to feed back to the base station, through the random access information, the information on whether the first data is received successfully. For example, the UE can perform a feedback by the manner of sending or not sending the random access information. Taking an example for illustration, if the UE succeeds in receiving the first data, then the random access information is sent, otherwise the random access information is not sent. For another example, the UE can also perform a feedback by the manner of the random access information carrying an acknowledgement (ACK) or a negative acknowledgement (NACK). Taking an example for illustration, if the UE succeeds in receiving the first data, then the ACK is carried in the random access information, otherwise the NACK is carried in the random access information. For still another example, the UE can also perform a feedback by the manner of employing different random access information. Taking an example for illustration, the base station sends multiple pieces of random access information to the UE includes, if the UE succeeds in receiving the first data, then a piece of random access information is employed, otherwise another piece of random access information is employed.

As for the base station, after the first data and the random access information are sent to the UE simultaneously, it will acquire the receiving state information of the first data fed back by the UE through the random access information, i.e. acquiring the information whether the UE succeeds in receiving the first data, then downlink transmission of the first data is completed hitherto.

In this embodiment, the base station sends first data and random access information to a UE simultaneously, and the UE feeds back to the base station through the random access information whether the first data is received successfully, transmission of service data to the UE is implemented during a random access procedure or prior to the random access procedure, so that the UE can receive service data transmitted by the base station during the random access procedure or prior to the random access procedure, rather than as the prior art where services can be carried out by the base station with the UE only after a random access procedure, thereby transmission efficiency of the service data is improved.

The random access information issued by the base station to the UE may include a dedicated preamble assigned by the base station for the UE to use and/or a PRACH resource assigned by the base station for the UE to use.

The procedure of performing the non-contention based random access by the UE based on the random access information includes:

If the random access information only includes a dedicated preamble, it is illustrated that the UE can use any PRACH resources, then the UE uses any PRACH resources from all the PRACH resources to send the dedicated preamble so as to perform the non-contention based random access procedure. If the random access information only includes a PRACH resource, it is illustrated that all the preambles on the resource are reserved for the UE, the UE can employ any preamble on the PRACH resource, then the UE sends any preamble on the PRACH resource so as to perform the non-contention based random access procedure. If the random access information includes a dedicated preamble and a PRACH resource simultaneously, it is illustrated that the UE needs to use the PRACH resource to send the dedicated preamble, then the UE sends the dedicated preamble on the PRACH resource so as to perform the non-contention based random access procedure.

Preferably, a first implementation mode of the base station sending the first data and the random access information to the UE simultaneously, includes that: the base station sends a physical downlink control channel (PDCCH) and a physical downlink shared channel (PDSCH) to the UE simultaneously, where the PDCCH includes downlink scheduling (DL Assignment) information, and the PDSCH includes the first data, an identifier of the first data, the random access information and an identifier of the random access information. The PDCCH refers to a control signaling sent in the PDCCH actually, in which the downlink scheduling information can be included; the PDSCH refers to data sent in the PDSCH actually, which refers to data from a layer higher than the physical layer.

In this implementation mode, even if the UE is in a state of uplink out of sync, if having services requiring the first data to be transmitted, the base station will schedule the first data to the UE directly through the DL Assignment information, i.e. send the first data which is taken as a media access control (MAC) control element (CE) or a media access control service data unit (SDU) to the UE through the PDSCH. Meanwhile, the base station sends the random access information required by the UE for the non-contention based random access procedure, as a newly-added MAC CE, to the UE through the PDSCH.

Both the identifier of the first data and the identifier of the random access information are logical channel identifiers (Logical Channel Identity, LCID), and the difference therein lies in that corresponding LCID values are different. As for the LCID value of the random access information, a value can be selected, from LCID values reserved currently, for it.

Further, in this implementation mode, the random access information transmitted in the PDSCH (i.e. the newly-added MAC CE) can include a bit corresponding to the dedicated preamble and the PRACH resource simultaneously. If the random access information only includes the dedicated preamble, then the bit corresponding to the PRACH resource in the PDSCH is set to 0. If the random access information only includes the PRACH resource, then the bit corresponding to the dedicated preamble in the PDSCH is set to 0.

Further, in this implementation mode, if the random access information only includes the dedicated preamble, then the random access information transmitted in the PDSCH (i.e. the newly-added MAC CE) can also not include the bit corresponding to the PRACH resource. If the random access information only includes the PRACH resource, then the random access information transmitted in the PDSCH (i.e. the newly-added MAC CE) can also not include the bit corresponding to the dedicated preamble.

Further, in this implementation mode, the first data can be a RRC release message. Base on this, the PDSCH can also include second indication information. The second indication information is configured to instruct the UE not to feed back a radio link control (RLC) status report to the base station after the RRC release message being received. Specifically, the base station can set a polling bit in a RLC protocol data unit (PDU) transmitted in the PDSCH to be 0, taking as the second indication information. As for the UE, after the RRC release message is received successfully, the RLC status report will not be fed back to the base station, and also the UE will not be triggered to perform a new random access procedure (e.g., the UE is in a state of uplink out of sync, but there is also uplink data needed to be sent, the UE needs to complete the uplink by performing the random access procedure firstly, and request an uplink resource to send the uplink data). As for the base station, whether a RRC connection with the UE should be released, it can be determined through the acquired information fed back by the UE that whether the first data is received successfully.

Preferably, a second implementation mode of the base station sending the first data and the random access information to the UE simultaneously, includes that: the base station sends a PDCCH and a PDSCH to the UE simultaneously, where the PDCCH includes first indication information, DL Assignment information and the random access information, the first indication information is configured to indicate that the PDCCH carries DL Assignment information and the random access information simultaneously. The PDSCH includes the first data and an identifier of the first data.

In this implementation mode, even if the UE is in a state of uplink out of sync, if the base station has services requiring the first data to be sent, the base station will schedule the first data to the UE directly through the DL Assignment information, i.e. send the first data as an MAC CE or an MAC SDU to the UE through the PDSCH. Meanwhile, the base station carries in the PDCCH the random access information required by the UE for the non-contention based random access procedure, to send the same to the UE together with the DL Assignment information.

In this implementation mode, the base station can realize the purpose of simultaneously carrying the random access information and the DL Assignment information through the PDCCH by setting the bit of related information carried by a PDCCH which is used in the prior art for the UE to perform the random access, to a special value, such as 0 or 1. Taking an example for illustration, a PDCCH which is used in the prior art for the UE to perform the random access adopts a downlink control information (Downlink Control Information, DCI) format, that is DCI1A, the PDCCH carries the following information:

Localized/Distributed virtual resource block assignment flag (Localized/Distributed VRB assignment flag): 1 bit, which is set to "0" (1 bit is set to '0');

Resource block assignment: $\lceil \log_2(N_{RB}^{DL}(N_{RB}^{DL}+1)/2) \rceil$ bits, where all bits are set to 1 ($\lceil \log_2(N_{RB}^{DL}(N_{RB}^{DL}+1)/2) \rceil$ bits, where all bits shall be set to 1);

Preamble index: 6 bits;

Physical random access channel (PRACH) mask index (PRACH Mask Index): 4 bits;

All the remaining bits are set to 0 (All the remaining bits in format 1A for compact scheduling assignment of one PDSCH codeword are set to zero).

Particularly, the base station indicates that the PDCCH is used for the UE to perform the random access by setting the bits except for the preamble index and the PRACH mask index to a special value, e.g., setting the Localized/Distributed VRB assignment flag to 1, setting the Resource block assignment to 1, and setting all the remaining bits to 0, that is, a PDCCH order. Based on this, the base station can take out, from all the bits which are set to special values, a part of bits for carrying the DL Assignment information and the remaining bits are still set to 0 or 1, so as to realize the purpose that the PDCCH carries the random access information and the DL Assignment information simultaneously.

Alternatively, in this implementation mode, in order to save the number of bits of the PDCCH, all or a part of information which is included in the foregoing random access information can be semi-statically configured through a high layer signaling, e.g., a RRC message. For example, the dedicated preamble used by the UE can be semi-statically configured.

Alternatively, in order to save the number of bits of the PDCCH, all or a part of information of the foregoing DL Assignment information can be semi-statically configured through a high layer signaling, e.g., a RRC message. For example, modulation and coding scheme (MCS) used can be semi-statically configured, a hybrid automatic repeat request (HARQ) process used can be semi-statically configured, and the like.

Further, in this implementation mode, the base station can also perform a transmission of the random access information and the DL assignment information at the same time by other DCI formats or by designing a new DCI format.

Further, in this implementation mode, the first data can be a RRC release message. Base on this, the PDSCH can also include second indication information. The second indication information is configured to instruct the UE not to feed back a RLC status report to the base station after the RRC release message being received. Specifically, the base station can take the polling position 0 in a RLC PDU in the PDSCH as the second indication information. As for the UE, after the RRC release message is received successfully, the RLC status report will not be fed back to the base station, and also the UE will not be triggered to perform a non-contention based random access procedure. As for the base station, whether a RRC connection with the UE should be released, it can be determined through the acquired information on whether the first data is received successfully, fed back by the UE.

Preferably, a third implementation mode of the base station sending the first data and the random access information to the UE simultaneously, includes that: the base station sends a PDCCH to the UE, where the PDCCH includes first indication information and the random access information.

Alternatively, in this implementation mode, the base station can carry the first data by setting a value of at least one bit in the PDCCH as a preset value. A corresponding relation exists between the preset value that is set to the at least one bit and the first data.

Alternatively, in this implementation mode, the base station may not transmit the PDSCH any more so as to save resources.

This implementation mode is particularly applied to the first data being the RRC release message, but is not limited thereto.

Further, in the foregoing implementation modes, the random access information may include a dedicated preamble and/or PRACH resource information.

Based on this, the base station acquiring the receiving state information of the first data fed back by the UE through the random access information, includes:

If, within a specified time, the base station receives the dedicated preamble sent by the UE, or any preambles sent by the UE on the PRACH resource in the random access information, it is determined that the UE succeeds in receiving the first data. If, within the specified time, the base station does not receive the dedicated preamble sent by the UE, or any preambles sent by the UE on the PRACH resource in the random access information, it is determined that the UE fails to receive the first data. In this implementation mode, the only difference lies in sending a preamble and not sending a preamble. This implementation mode is also applied to the foregoing three implementation modes where the base station sends the first data and the random access information to the UE simultaneously.

Or,

The base station determines that the UE succeeds in receiving the first data according to an ACK which is carried in the received dedicated preamble sent by the UE or in any received preambles sent by the UE on the PRACH resource in the random access information. The base station determines that the UE fails to receive the first data according to a NACK which is carried in the received dedicated preamble sent by the UE or in any received preambles sent by the UE on the PRACH resource in the random access information. In this implementation mode, the ACK or the NACK is carried by preamble, and the random access information and the first data are required to be received independently, and thus this implementation mode is applied to the foregoing second implementation mode of the base station sending the first data and the random access information to the UE simultaneously.

The UE sends the dedicated preamble includes that: if the random access information only includes the dedicated preamble, then the UE can send the dedicated preamble to the base station on any PRACH resources; if the random access information includes the dedicated preamble and a PRACH resource simultaneously, then the UE sends the dedicated preamble on the PRACH resource in the random access information. The UE sending any preambles on the PRACH resource in the random access information, includes that: if the random access information only includes a PRACH resource, then the UE sends on the PRACH resource any preamble that can be used on the PRACH resource; if the random access information includes a dedicated preamble and a PRACH resource simultaneously, then the UE can send the dedicated preamble on the PRACH resource, and can also send other preambles on the PRACH resource.

Further, if the dedicated preamble includes a first preamble and a second preamble, then the base station acquiring the receiving state information of the first data fed back by the UE through the random access information, can also include the following implementation modes:

If the base station receives the first preamble sent by the UE, it is determined that the UE succeeds in receiving the first data; if the base station receives the second preamble sent by the UE, it is determined that the UE fails to receive the first data. That is, the UE feeds back information that the first data is received successfully and is received unsuccessfully through different preambles. In this implementation mode, the random access information and the first data are required to be received independently, thus this implementation mode is applied to the foregoing second implementation mode of the base station sending the first data and the random access information to the UE simultaneously.

Further, after determining that the UE fails to receive the first data, the base station can re-perform an operation of sending the first data and the random access information to the UE simultaneously, i.e. perform a retransmission of the first data, and perform this till the base station determines that the UE succeeds in receiving the first data or till retransmission times reach a preset first maximum number of times of retransmissions.

Further, if the first data is a RRC release message, the base station releases a RRC connection with the UE after determining that the UE succeeds in receiving the first data, or the number of retransmission times reaching the preset first maximum number of retransmission times.

Further, after receiving the dedicated preamble or any preamble sent by the UE, i.e. after determining that the UE succeeds in receiving the first data, the base station sends a random access response (RAR) to the UE so as to instruct the UE to perform an uplink synchronization. Or, after determining that the UE fails to receive the first data, the base station can also send a RAR to the UE so as to instruct the UE to perform an uplink synchronization.

Further, a maximum retransmission time or a second maximum number of retransmission times can also be included in the random access information so as to instruct the UE to repeatedly send the dedicated preamble or any preamble till the number of the retransmission times reach the second maximum number of retransmission times or till the retransmission time reaches the maximum retransmission time. In this case, the reliability of transmission of the preamble can be increased.

Besides being carried by the random access information, the maximum retransmission time or the second maximum number of retransmission times can also be specified by a protocol or be configured by a high layer.

In the foregoing embodiments, the base station simultaneously transmits random access information and first data to a UE by means of various implementation modes, and the base station sends service data to the UE during a random access procedure or prior to a random access procedure, rather than as the prior art where after a random access procedure being finished, thereby transmission efficiency of the service data is improved.

Figure 2:
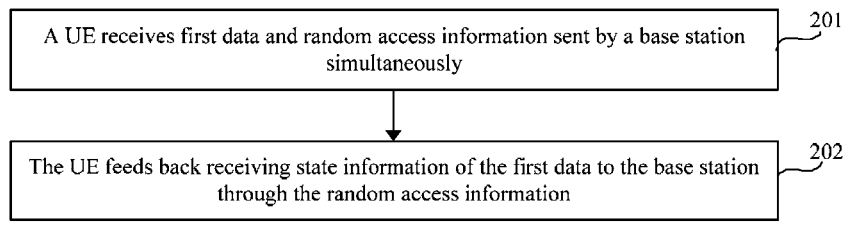
FIG. 2 is a flow chart of a data transmission method provided by another embodiment of the present invention.

FIG. 2 is a flow chart of a data transmission method provided by another embodiment of the present invention. As shown in FIG. 2, the method of this embodiment includes:

Step 201, a UE receives first data and random access information sent by a base station simultaneously.

Step 202, the UE feeds back receiving state information of the first data to the base station through the random access information.

The first data can be data of a DRB, and can also be data of a SRB. The data of the SRB can be a RRC release message, but is not limited thereto.

The random access information is used to trigger the UE to perform a non-contention based random access in one aspect, in another aspect act as a carrier of the receiving state information of the first data fed back by the UE to the base station, i.e. used for the UE to feed back to the base station whether the first data is received successfully.

In this embodiment, if the UE has already been in a state of uplink out of sync, but when the base station has services requiring downlink transmission, the base station will send the data needed to be sent (i.e. the first data) and the random access information to the UE simultaneously.

The UE will receive the first data and the random access information sent by the base station simultaneously, and then the UE will feed back to the base station through the random access information whether the first data is received successfully, thereby completing downlink transmission of the first data.

If the UE succeeds in receiving the random access information, then the UE performs a non-contention based random access procedure through the random access information, i.e. sends a preamble to the base station on a PRACH resource. Meanwhile, the UE can feed back information to the base station through the random access information that the first data is received successfully and/or the first data is received unsuccessfully. If the UE fails to receive the random access information, then the UE will not send a preamble to the base station on the PRACH resource, the base station will deem that both the random access information and the first data are transmitted unsuccessfully, this is also equivalent to feeding back information to the base station through the random access information that the first data is received unsuccessfully.

There may be many manners for the UE to feed back information to the base station through the random access information that the first data is received successfully or unsuccessfully. For example, the UE can perform a feedback by the manner of sending or not sending the random access information. Taking an example for illustration, if the UE succeeds in receiving the first data, then the random access information is sent, otherwise the random access information is not sent. For another example, the UE can also perform a feedback by the manner of carrying an ACK or a NACK by the random access information. Taking an example for illustration, if the UE succeeds in receiving the first data, then the ACK is carried in the random access information; otherwise the NACK is carried in the random access information. For still another example, the UE can also perform a feedback by the manner of employing different random access information. Taking an example for illustration, the by the base station sends multiple random access information to the UE, if the UE succeeds in receiving the first data, then a piece of random access information is employed, otherwise another piece of random access information is employed.

In this embodiment, the UE receives first data and random access information sent by the base station simultaneously, and feeds back receiving status of the first data to the base station through the random access information, receiving of service data sent by the base station is implemented during a random access procedure or prior to a random access procedure, rather than the prior art where service data sent by the base station can be received only after a successful random access, thereby data transmission efficiency is improved.

The random access information received by the UE may include a dedicated preamble assigned by the base station for the UE to use and/or a PRACH resource specified by the base station for the UE to use, but is not limited thereto.

The procedure of performing the non-contention based random access by the UE according to the random access information includes:

If the random access information only includes a dedicated preamble, which means that the UE can use any PRACH resources, then the UE uses any PRACH resource from all the PRACH resources to send the dedicated preamble so as to perform the non-contention based random access procedure. If the random access information only includes a PRACH resource, which means that all the preambles on the resource are reserved for the UE, the UE can use any preamble on the PRACH resource, then the UE sends any preamble on the PRACH resource so as to perform the non-contention based random access procedure. If the random access information includes a dedicated preamble and a PRACH resource simultaneously, which means that the UE needs to use the PRACH resource to send the dedicated preamble, then the UE sends the dedicated preamble on the PRACH resource so as to perform the non-contention based random access procedure.

Preferably, a first implementation mode of the UE receiving the first data and the random access information sent by the base station simultaneously, includes that: the UE receives simultaneously a PDCCH and a PDSCH sent by the base station, where the PDCCH includes downlink scheduling (DL Assignment) information, and the PDSCH includes the first data, an identifier of the first data, the random access information and an identifier of the random access information.

Both the identifier of the first data and the identifier of the random access information are LCIDs, and the difference lies in that corresponding LCID values are different. As for the LCID value of the random access information, a value can be selected for it from LCID values reserved currently.

In this implementation mode, even when the UE is in a state of uplink out of sync, if having services requiring the first data to be transmitted, the base station will schedule the first data to the UE directly through the DL Assignment information, i.e. transmit the first data which is taken as an MAC CE or an MAC SDU to the UE through the PDSCH. Meanwhile, the base station sends the random access information required by the UE for the non-contention based random access procedure which is also taken as a newly-added MAC CE to the UE through the PDSCH. Correspondingly, the implementation mode of the UE feeding back the receiving state information of the first data, to the base station through the random access information, includes:

The UE receives the PDCCH, and receives and parses the PDSCH according to the DL Assignment information in the PDCCH. If the UE parses out the random access information and the first data from the PDSCH, then the UE sends the dedicated preamble to the base station, or sends any preamble to the base station on the PRACH resource, so as to feed back to the base station a success in receiving the first data. If the UE fails to parse out the first data and the random access information from the PDSCH, the UE does not perform an operation of sending a preamble to the base station, so as to feed back to the base station a failure in receiving the first data.

The first data can be a RRC release message, but is not limited thereto.

If the first data is a RRC release message, then second indication information can also be included in the PDSCH. The second indication information is used to instruct the UE not to feed back a RLC status report to the base station after the RRC release message being received. Correspondingly, the UE will also parse out the second indication information from the PDSCH, and not feed back the RLC status report to the base station after the RRC release message being acquired, and directly disconnect a RRC connection with the base station, so as to avoid triggering the UE to perform the non-contention based random access procedure. The base station can set a polling bit in a RLC PDU in the PDSCH to be 0, taking as the second indication information. In addition, the UE determines not to feed back the RLC status report to the base station by judging that the polling bit in the RLC PDU is 0.

Preferably, a second implementation mode of the UE receiving the first data and the random access information sent by the base station simultaneously, includes that: the UE receives simultaneously, a PDCCH and a PDSCH transmitted by the base station, where the PDCCH includes first indication information, DL Assignment information and the random access information; the first indication information is used to indicate that the PDCCH carries the DL Assignment information and the random access information simultaneously. The PDSCH includes the first data and an identifier of the first data.

The identifier of the first data is an LCID, and the value thereof is related to the type or the feature of the first data.

The first indication information can be carried through at least one bit in the PDCCH. For a specific implementation about simultaneously carrying the random access information and the DL Assignment information through the PDCCH, reference may be made to descriptions on the previous second implementation mode of the base station sending the first data and the random access information to the UE simultaneously.

In this implementation mode, even when the UE is in a state of uplink out of sync, if having services requiring the first data to be transmitted, the base station will schedule the first data to the UE directly through the DL Assignment information, i.e. send the first data, which is taken as an MAC CE of the PDSCH, to the UE. Meanwhile, the base station carries in the PDCCH the random access information required by the UE for the non-contention based random access procedure and sends a same to the UE together with the DL Assignment information.

Correspondingly, an implementation mode of the UE feeding back the receiving state information of the first data to the base station through the random access information includes:

The UE receives and parses the PDCCH, acquires the DL Assignment information and the random access information from the PDCCH according to the first indication information in the PDCCH. Then the UE receives and parses the PDSCH according to the DL Assignment information. If the UE parses out the first data from the PDSCH, the UE sends the dedicated preamble to the base station, or sends any preamble to the base station on the PRACH resource, or sends the dedicated preamble which carries an ACK to the base station, or sends any preamble which carries the ACK to the base station on the PRACH resource so as to feed back to the base station a success in receiving the first data. If the UE fails to parse out the first data from the PDSCH, the UE does not perform an operation of sending a preamble to the base station, or sends a dedicated preamble which carries a NACK to the base station, or sends any preamble which carries the NACK to the base station on the PRACH resource so as to feed back to the base station a failure in receiving the first data.

Alternatively, the base station can also assign multiple preambles to the UE, i.e. the dedicated preamble in the random access information includes multiple preambles. For example, illustrations are made based on that the dedicated preamble includes a first preamble and a second preamble. Based on this, another implementation mode of the UE feeding back the receiving state information of the first data to the base station through the random access information includes:

The UE receives and parses the PDCCH, then acquires the DL Assignment information and the random access information from the PDCCH according to the first indication information in the PDCCH. Then the UE receives and parses the PDSCH according to the DL Assignment information. If the UE parses out the first data from the PDSCH, then the UE sends the first preamble to the base station so as to feed back to the base station a success in receiving the first data. If the UE fails to parse out the first data from the PDSCH, then the UE sends the second preamble to the base station so as to feed back to the base station a failure in receiving the first data. That is, the base station assigns two preambles to the UE, one is used to indicate a success in receiving the first data, and the other is used to indicate a failure in receiving the first data.

The first data can be a RRC release message, but is not limited thereto.

If the first data is a RRC release message, then second indication information can also be included in the PDSCH. The second indication information is used to instruct the UE not to feed back a RLC status report to the base station after the RRC release message being received. Correspondingly, the UE will also parse out the second indication information from the PDSCH, and not feed back the RLC status report to the base station after the RRC release message being acquired, and directly disconnect a RRC connection with the base station, so as to avoid triggering the UE to perform the non-contention based random access procedure. The base station can set a polling bit in a RLC PDU in the PDSCH to be 0, taking as the second indication information. In addition, the UE determines not to feed back the RLC status report to the base station by judging that the polling bit in the RLC PDU is 0.

Preferably, a third implementation mode of the UE receiving the first data and the random access information sent by the base station simultaneously includes that: the UE receives a PDCCH sent by the base station, where the PDCCH includes the first data and the random access information.

This implementation mode is particularly applied to the first data being the RRC release message, but is not limited thereto.

In this implementation mode, the base station can carry the first data by means of at least one bit taking a certain value in the PDCCH. As for the UE, bit information which is used for carrying the first data in the PDCCH may be pre-learned.

Correspondingly, the implementation mode of the UE feeding back the receiving state information of the first data to the base station through the random access information includes:

The UE receives and parses the PDCCH. If the UE parses out the first data and the random access information from the PDCCH, the UE sends a dedicated preamble to the base station, or sends any preamble to the base station on the PRACH resource, or sends the dedicated preamble which carries an ACK to the base station, or sends any preamble which carries the ACK to the base station on the PRACH resource so as to feed back to the base station a success in receiving the first data. If the UE fails to parse out the first data and the random access information from the PDCCH, then the UE does not perform an operation of sending a preamble to the base station. As for the base station, if feedback information of the UE is not received within a specified time, then it will be deemed that the UE fails to receive the first data.

Further, after sending the dedicated preamble to the base station or after sending any preamble on the PRACH resource in the random access information, the UE receives a RAR sent by the base station, and performs an uplink synchronization. For the procedure of performing the uplink synchronization by the UE, reference may be made to the prior art, and details will not be given herein.

Further, in order to ensure the reliability of sending the dedicated preamble or any preamble to the base station by the UE, the UE can send the dedicated preamble to the base station repeatedly, or send any preamble to the base station on the PRACH resource in the random access information repeatedly till retransmission times reach the second maximum number of retransmission times or till retransmission time reaches the maximum retransmission time.

The maximum retransmission time or the second maximum number of retransmission times can be prefixed by a protocol, can also be configured by a high layer, and can also be carried by the random access information.

If the maximum retransmission time or the second maximum number of retransmission times is carried by the random access information, then before sending the dedicated preamble or any preamble repeatedly by the UE, including: the UE parses out the maximum retransmission time or the second maximum number of retransmission times from the random access information. Then, the UE performs a repeated transmission of the dedicated preamble or any preamble based on the acquired maximum retransmission time or second maximum number of retransmission times.

In the foregoing embodiments, the UE receives random access information and first data sent by a base station simultaneously by means of various implementation modes, and receives service data sent by the base station during a random access procedure or prior to a random access procedure, i.e. transmission of the service data is implemented during the random access procedure or prior to the random access procedure, rather than as the prior art where after a random access procedure being finished, thereby transmission efficiency of the service data is improved.

Figure 3A:
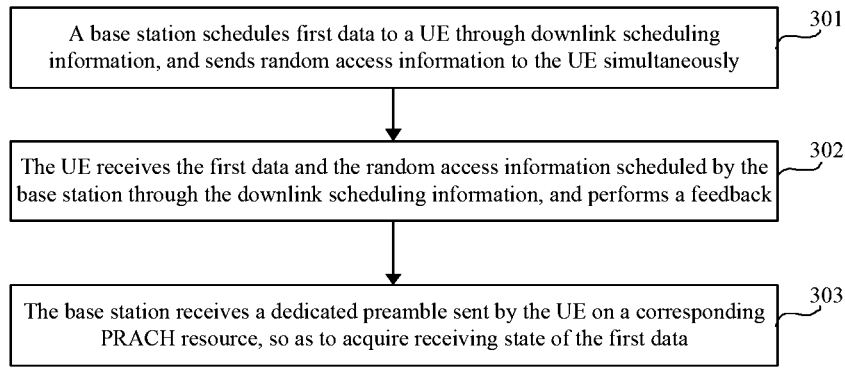
FIG. 3A is a flow chart of a data transmission method provided by still another embodiment of the present invention.

FIG. 3A is a flow chart of a data transmission method provided by still another embodiment of the present invention. As shown in FIG. 3A, the method of this embodiment includes:

Step 301, a base station schedules first data to a UE through DL Assignment information and sends random access information to the UE simultaneously.

In this embodiment, when the base station has downlink data (i.e. the first data) requiring to be scheduled, e.g., can be data of a DRB or data of a SRB, if the UE has already been in a state of uplink out of sync at this time, i.e. a timing alignment timer (TAT) times out, then the base station schedules the first data to the UE directly through the DL Assignment information. The base station sends the DL Assignment information through a PDCCH, and sends the first data through a PDSCH. While sending the first data to the UE, the base station sends the random access information to the UE. The role of the random access information is to allow the UE to perform a feedback on receiving state of the first data through a random access procedure. The random access information can include at least one of the followings: a dedicated preamble or PRACH resource information used by the dedicated preamble.

In this embodiment, a manner of the base station carrying the random access information through the PDSCH can be use of a new MAC CE, for which a value is selected from reserved LCID values to represent the newly-added MAC CE. As shown in Table 1, LCID=11010 is used to represent the newly-added MAC CE. Prior to this, the reserved LCID values are 01011-11010, and LCID values reserved after are 01011-11001.

TABLE 1

| LCID value | Represented meaning |
|---|---|
| 00000 | Common control channel (CCCH) |
| 00001-01010 | Identifier of the logical channel (Identity of the logical channel) |
| 01011-11001 | Reserved (Reserved) |
| 11010 | Random access information |
| 11011 | Activation/Deactivation (Activation/Deactivation) |
| 11100 | UE contention resolution identifier (UE Contention Resolution Identity) |
| 11101 | Timing advance command (Timing Advance Command) |
| 11110 | Discontinuous reception command (DRX Command) |
| 11111 | Padding (Padding) |

An LCID value representing the MAC CE can also use other values to represent, and is not limited to selecting from the reserved LCID values.

Figure 3B:
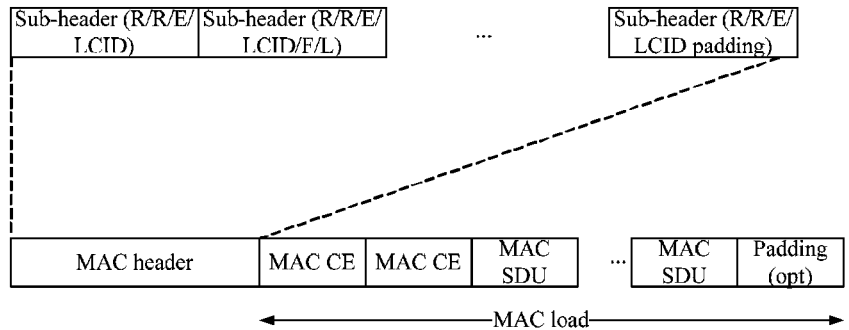
FIG. 3B is a schematic structural diagram of data transmitted on a PDSCH provided by still another embodiment of the present invention.

Structure of data transmitted on the PDSCH (i.e. an MAC PDU) is as shown in FIG. 3B, mainly including an MAC header, an MAC CE, an MAC SDU and an optional padding (Padding), etc. The MAC header includes sub-headers oneto-one corresponding to subsequent MAC CE and MAC SDU. Each sub-header includes a LCID corresponding to the MAC CE or the MAC SDU.

Figure 3C:
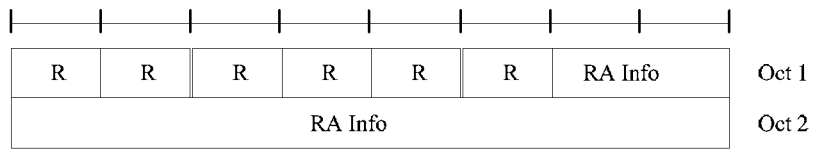
FIG. 3C is a schematic structural diagram of an MAC CE provided by still another embodiment of the present invention.

This embodiment provides a format of a newly-added MAC CE, as shown in FIG. 3C. The MAC CE includes two octets totally, respectively are octet 1 (Oct1) and octet 2 (Oct2). "R" represents reserved; "RA Info" represents random access information.

The random access information above can include a dedicated preamble and/or PRACH resource information used. When only preamble information is required to be transmitted, bits representing PRACH resource information in FIG. 3C can be set to 0, meaning no restrictions on a PRACH resource used. When only the PRACH resource information is required to be transmitted, bits representing the preamble information in FIG. 3C can be set to 0, meaning performing a random access procedure by using a preamble configured through other manners or any preambles. The preamble configured through other manners can be a preamble reserved by a protocol or a preamble configured through a broadcast message or a RRC message.

Optionally, the newly-added MAC CE in this embodiment can also only include bits corresponding to the dedicated preamble, or only include bits corresponding to the PRACH resource information used.

Based on the above carrying manner, the base station can schedule the first data and the random access information to the UE together when the UE is in a state of uplink out of sync.

Step 302, the UE receives the first data and the random access information scheduled by the base station through the DL Assignment information, and performs a feedback.

In this embodiment, the UE receives and parses a PDCCH, and receives and parses a PDSCH according to the DL Assignment information in the PDCCH. If the UE can parse out the first data and the random access information, then it can send a dedicated preamble carried by the random access information, as an ACK feedback of the first data, on a PRACH resource after a certain time, or carry ACK information in a dedicated preamble and feed back to the base station. If the UE cannot parse out the first data and the random access information, the UE does not perform an operation of sending a preamble to the base station. The certain time can be configured or fixed by a protocol.

The difference with the prior art lies in that, in this embodiment, after the UE sends a dedicated preamble to the base station, a RAR receiving window does not need to be started, i.e. the UE does not perform an uplink synchronization, and can continue to be in a state of uplink out of sync.

Step 303, the base station receives a dedicated preamble sent by the UE on a corresponding PRACH resource so as to acquire receiving state of the first data.

After receiving the dedicated preamble sent by the UE or an ACK fed back by the dedicated preamble on the corresponding PRACH resource, the base station deems that the first data is received by the UE successfully, and does not send a RAR to the UE, the data transmission procedure is ended. Where, the UE will not expect the RAR sent by the base station in this scenario, and the random access procedure is also ended hitherto.

If the base station does not receive within a specified time the dedicated preamble sent by the UE, then the base station initiates retransmission of the first data once again, i.e. restarts to perform a data transmission process from Step 301. The retransmission procedure is the prior art, and will not be repeated herein.

The specified time can be preconfigured, and a specific value thereof is not defined.

Optionally, in order to increase transmission reliability of the dedicated preamble, the UE can send the dedicated preamble repeatedly within a period of time, where the period of time can be fixed by a protocol or configured by a high layer, and can also be carried in the random access information. Or, the number of repetition times of the dedicated preamble can also be configured. The number of repetition times can be fixed by a protocol or configured by a high layer, and can also be carried in the random access information.

In this embodiment, the base station performs PDSCH assignment through the PDCCH, and sends the UE the random access information, which is taken as a new MAC CE, together with the first data through the PDSCH, transmission of the first data is achieved during a random access procedure or prior to a random access procedure, no need to transmit after a random access procedure, thereby data transmission efficiency is improved.

In the embodiment as shown in FIG. 3A, if the base station needs to release a RRC connection, then will send a RRC release message, that is, the RRC release message is the first data, which needs to be transmitted. In the prior art, if a UE uplink has already been out of sync at this time, then the base station also needs to, through a PDCCH order firstly, let the UE perform an uplink synchronization through the random access procedure, and then send the RRC release message to the UE. However, in the embodiment as shown in FIG. 3A, transmission efficiency of the RRC release message is improved by directly assigning the RRC release message and the random access information to the UE at the same time.

However, since the RRC release message uses an acknowledgement mode radio link control (AM RLC) mode, after receiving the RRC release message, the UE will feed back a RLC status report, and then the UE will also be triggered to perform the random access procedure. In order to avoid the UE from performing the random access procedure, the base station in this embodiment can process as follows: if the first data to be sent is a RRC release message, then the base station does not notify the UE of generating and feeding back a RLC status report, or say, the base station tells the UE no need to feed back the RLC status report. Specifically, a RLC layer of the base station may not carry a polling bit in a RLC PDU which sends the RRC release message (i.e. set the polling bit to 0), and then an MAC CE sent by the base station to the UE will carry indication information that the UE is not required to feed back the RLC. The polling bit in the RLC PDU is used for notifying the UE of generating the RLC status report.

Based on this, the RLC layer of the base station in this embodiment can judge whether the first data is received by the UE successfully according to information reported by an MAC layer of the base station. That is, the information reported by the MAC layer is information fed back by the UE whether the first data is received successfully. Or, after repeatedly sending the RRC release message for many times, the base station can release the UE. After receiving the RRC release message, the UE also releases a RRC connection.

In this embodiment, by means of setting the polling bit in the RLC PDU to 0, it is guaranteed that the RRC release message is sent during a random access procedure or prior to a random access procedure, and the UE will not be triggered to perform the random access procedure due to sending the RLC status report, a normal release of the RRC connection is ensured, and release efficiency of the RRC connection is improved.

Figure 4:
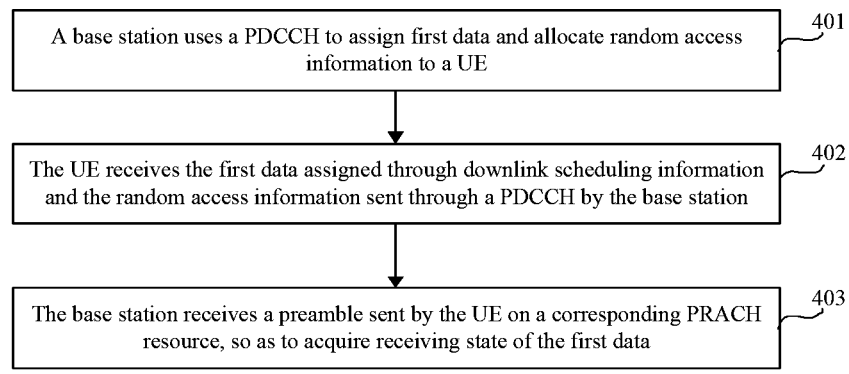
FIG. 4 is a flow chart of a data transmission method provided by still another embodiment of the present invention.

FIG. 4 is a flow chart of a data transmission method provided by still another embodiment of the present invention. As shown in FIG. 4, the method of this embodiment includes:

Step 401, a base station uses, a PDCCH to schedule the first data and allocate the random access information.

In this embodiment, when the base station has downlink data (i.e. the first data) needed to be scheduled, e.g., can be data of a DRB or data of a SRB, if the UE has already been in a state of uplink out of sync at this time, i.e. a TAT times out, then the base station schedules the first data to the UE directly through the DL Assignment information. Where, the base station sends the DL Assignment information through the PDCCH, and sends the first data through a PDSCH. In this embodiment, the base station provides the random access information to the UE through the PDCCH at the same time. That is, in this embodiment, the random access information and the DL Assignment information are carried in the PDCCH simultaneously.

In the prior art, a PDCCH order which causes the UE to perform a random access procedure and PDCCH Assignment for data assignment employ a same DCI format, i.e. DCI1A, where, when the PDCCH acts as the PDCCH Order, information carried is as follows:

Localized/distributed virtual resource block assignment flag: 1 bit, which is set to "0";

Resource block assignment: $\lceil \log_2(N_{RB}^{DL}(N_{RB}^{DL}+1)/2) \rceil$ bits, where all bits are set to 1 ($\lceil \log_2(N_{RB}^{DL}(N_{RB}^{DL}+1)/2) \rceil$ bits, where all bits shall be set to 1);

Preamble index: 6 bits;

Physical random access channel (PRACH) mask index (PRACH Mask Index): 4 bits;

All the remaining bits are set to 0 (All the remaining bits in format 1A for compact scheduling assignment of one PDSCH codeword are set to zero).

In order to represent the PDCCH as a PDCCH order, the base station needs to set bits, except that occupied by the preamble index and the PRACH mask index, to special values, so as to indicate that what the PDCCH carries is the random access information. Based on this, the base station in this embodiment can take out some bits from these special values for carrying the DL Assignment information, thereby realizing that the random access information and the DL Assignment information are carried in the PDCCH simultaneously. A basic structure of the PDCCH can include:

1 bit or more bits indicate that what the PDCCH carries is the random access information, or the DL Assignment information, or the random access information and the DL Assignment information, i.e. first indication information;

1 bit or more bits indicate the random access information used by the UE;

1 bit or more bits indicate corresponding DL Assignment information for scheduling the UE.

Optionally, in order to save the number of bits of the PDCCH, all or a part of information which is included in the foregoing random access information can be semi-statically configured through a high layer signaling, e.g., a RRC message. For example, the dedicated preamble used can be semi-statically configured, then the random access information may not include the dedicated preamble, thereby the number of bits occupied is reduced.

Optionally, in order to save the number of bits of the PDCCH, all or a part of information of the foregoing DL Assignment information can be semi-statically configured through a high layer signaling, e.g., a RRC message. For example, MCS used can be semi-statically configured, a HARQ process used can be semi-statically configured, and the like, then the DL Assignment information may not include information on the MCS and the HARQ process used, thereby helping to reduce the number of bits occupied.

The foregoing manner which allows the PDCCH to carry the random access information and the DL Assignment information simultaneously is a change or an expansion to the DCI format used by an existing PDCCH, but is not limited thereto. For example, also, other DCI formats can be used or a new DCI format can be designed to send the foregoing information, details will not be repeated herein.

Step 402, the UE receives the first data scheduled through DL Assignment information and the random access information sent through the PDCCH by the base station.

After receiving the foregoing PDCCH, according to indication bits therein, the UE knows that the PDCCH carries the random access information and the DL Assignment information. The UE decodes the PDSCH according to the DL Assignment information, and after a certain time (the time is mainly used for the UE to decode the PDSCH) uses the random access information to feed back whether the PDSCH is decoded successfully, i.e. feed back whether the first data is received successfully. The method where the UE uses the random access information to feed back can be: 1) the UE feeds back an ACK or a NACK by sending and not sending a preamble. 2) The UE performs a feedback to the base station by a preamble carrying ACK or NACK information. Where, the preamble can be a dedicated preamble specified in the random access information, or can also be any preambles sent on a PRACH resource in the random access information or a preamble configured through other manners.

The difference with the prior art lies in that, in this embodiment, after the UE sends a preamble, the UE does not need to start a RAR receiving window.

Step 403, the base station receives a preamble sent by the UE on a corresponding PRACH resource, so as to acquire receiving state of the first data.

After the base station receives the preamble sent by the UE or ACK information carried by the preamble, it is deemed that the first data is received by the UE successfully, and the data transmission procedure is ended. When the base station does not receive any preambles or receive NACK information carried by the preamble within a specified time, then it is deemed that the first data is not received by the UE. At this time, the base station can perform transmission of the first data started from Step 401 once more, one more transmission can be indicated as retransmission, and can also be indicated as new transmission. After receiving the once more transmitted PDCCH, the UE performs Step 402 repeatedly. That is, this process can be executed circularly till the first data reaches the maximum number of retransmission times or till the UE succeeds in receiving the first data.

Herein, for illustration, the specified time can be preconfigured, and a specific value thereof is not defined.

After receiving the preamble sent by the UE or the ACK carried by the preamble, the base station may not send a RAR to the UE. Likewise, the UE will not expect the RAR sent by the base station in this scenario, and the RA procedure is ended hitherto.

Optionally, after not receiving the preamble or receiving a NACK carried by the preamble, the base station may also send a RAR to the UE so as to instruct the UE to perform an uplink synchronization, so that when the base station reschedules the first data of the UE, the UE can perform a normal feedback.

Optionally, the base station may also assign two preambles to the UE, that is, the dedicated preamble included in the PRACH preamble of this embodiment includes a first preamble and a second preamble. The first preamble is used to indicate the ACK, and the second preamble is used to indicate the NACK.

Optionally, in order to increase transmission reliability of the dedicated preamble, the UE can send the dedicated preamble repeatedly within a period of time, where the period of time can be fixed by a protocol or configured by a high layer, and can also be carried in the random access information. Or, the number of repetition times of the dedicated preamble can also be configured. The number of repetition times can be fixed by a protocol or configured by a high layer, and can also be carried in the random access information.

In this embodiment, the base station performs assignment of the PDSCH through the PDCCH, and carries the random access information through the PDCCH simultaneously, so that the random access information and the first data are sent to the UE together, transmission of the first data is realized during a random access procedure or prior to a random access procedure, no need to transmit after a random access procedure, thereby data transmission efficiency is improved.

At the same time, in the embodiment as shown in FIG. 4, if the base station needs to release a RRC connection, then will send a RRC release message, that is, the RRC release message is the first data and needs to be sent. For a processing manner of the first data being the RRC release message, reference may be made to descriptions on the embodiment as shown in FIG. 3A, and will not be repeated herein. Likewise, in this embodiment, by means of setting a polling bit in a RLC PDU to 0, it is guaranteed that the RRC release message is sent during a random access procedure or prior to a random access procedure, and the UE will not be triggered to perform the random access procedure, a normal release of a RRC connection is ensured, and release efficiency of the RRC connection is improved.

Figure 5:
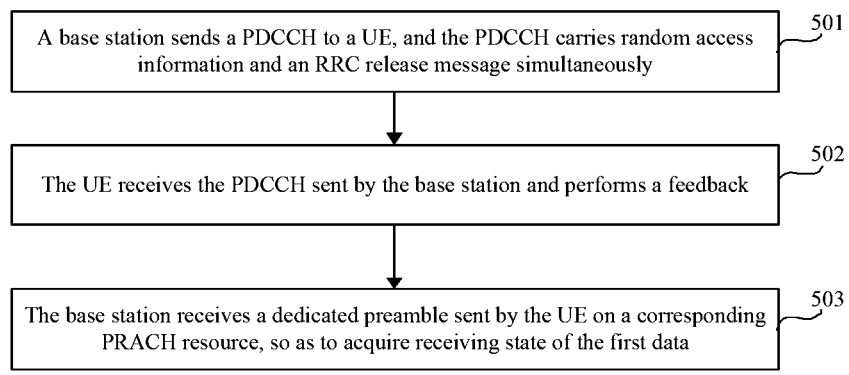
FIG. 5 is a flow chart of a data transmission method provided by still another embodiment of the present invention.

FIG. 5 is a flow chart of a data transmission method provided by still another embodiment of the present invention. As shown in FIG. 5, the method of this embodiment includes:

Step 501, a base station sends a PDCCH to a UE, and the PDCCH carries random access information and an RRC release message simultaneously.

This embodiment targets at further optimizing a RRC release scenario. That is, when the base station needs to release a RRC connection of the UE after UE is uplink out of sync, instead of sending the RRC release message, it notifies the UE of performing a RRC release through a PDCCH Order which causes the UE to perform a random access procedure.

Specifically, the base station can set one or some bits in the PDCCH Order to a special value to carry the RRC release message, thereby indicating that the purpose of the PDCCH Order is to perform a RRC release.

Step 502, the UE receives the PDCCH sent by the base station and performs a feedback.

After receiving the PDCCH Order, after a certain time, the UE performs the feedback through the random access information in the PDCCH Order, and releases the RRC connection. The certain time can be fixed by a protocol or configured by a high layer message or be carried by the PDCCH Order.

In this embodiment, an example is taken based on that the random access information includes a dedicated preamble, then for a manner of performing a feedback through the random access information by the UE, reference may be made to descriptions on Step 302, and will not be repeated herein.

Optionally, the UE can send the dedicated preamble repeatedly within a period of time, where the period of time can be fixed by a protocol or configured by a high layer, and can also be carried in the random access information. Or, the number of retransmission times of the dedicated preamble can also be configured. The number of retransmission times can be fixed by a protocol or configured by a high layer, and can also be carried in the random access information.

Step 503, the base station receives a dedicated preamble sent by the UE on a corresponding PRACH resource, so as to acquire receiving state of the first data.

If the base station receives the dedicated preamble on the corresponding PRACH resource, then it is deemed that the UE succeeds in receiving the PDCCH which carries the RRC release message, and then the base station releases a RRC connection with the UE.

If the base station does not receive within a specified time the dedicated preamble, then the base station re-performs Step 501 to send the PDCCH order to the UE so as to release the RRC connection. Where, the specified time can be fixed by a protocol or configured by a high layer message or carried in the random access information or the PDCCH Order.

In this embodiment, under the circumstance where a TAT times out, the base station sends the RRC release message and the random access information to the UE simultaneously through the PDCCH, so that a RRC release is completed during a random access procedure or prior to a random access procedure, rather than as the prior art where a random access is completed firstly and then a RRC release is performed, helping to save signaling overhead, and improving RRC release efficiency. In addition, this embodiment is also applied to the case where a TAT does not time out, at this time, the UE is in a state of uplink synchronization, an eNB only needs to directly send a RRC release message through the PDCCH in this embodiment, and does not need to carry random access information, after receiving the PDCCH which carries the RRC release message, the UE feeds back an ACK directly on a physical uplink control channel (PUCCH), likewise, the signaling overhead can also be saved, and the RRC release efficiency can be improved.

Figure 6:
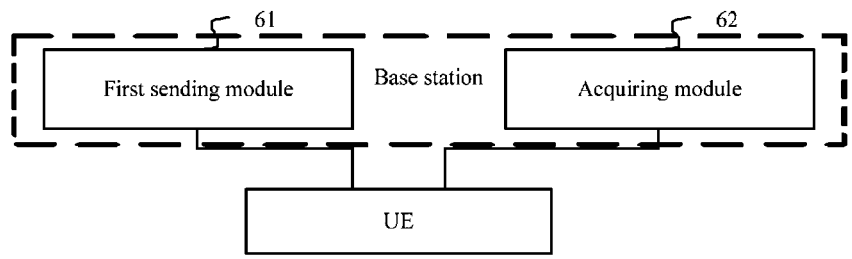
FIG. 6 is a schematic structural diagram of a base station provided by an embodiment of the present invention.

FIG. 6 is a schematic structural diagram of a base station provided by an embodiment of the present invention. As shown in FIG. 6, the base station in this embodiment includes: a first sending module 61 and an acquiring module 62.

The first sending module 61 is connected to a UE, and configured to send first data and random access information to the UE simultaneously. The acquiring module 62 is connected to the UE, and configured to acquire receiving state information of the first data, where the receiving state information is fed back by the UE through the random access information.

Each functional module of the base station in this embodiment can be used to perform a process of the data transmission method as shown in FIG. 1, specific operational principle thereof will not be repeated any more, please refer to descriptions on method embodiments for details.

In this embodiment, the base station can send the first data and the random access information to a UE simultaneously, when the UE is in a state of uplink out of sync, transmission of service data to the UE is implemented during a random access procedure or prior to a random access procedure, rather than as the prior art where transmission is performed after a random access procedure, thereby data transmission efficiency is improved.

Figure 7:
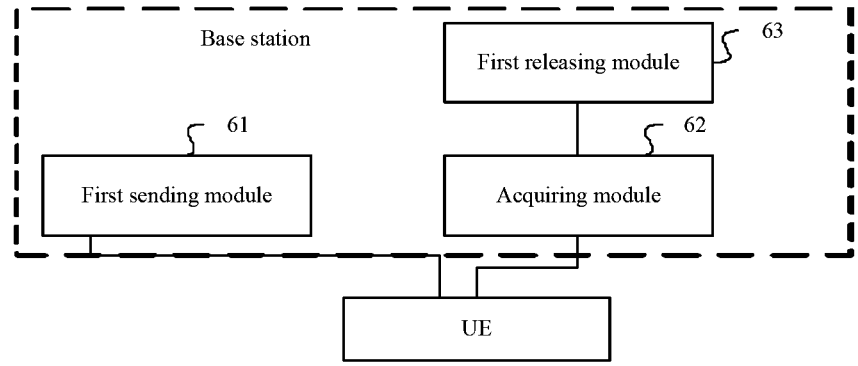
FIG. 7 is a schematic structural diagram of a base station provided by another embodiment of the present invention.

FIG. 7 is a schematic structural diagram of a base station provided by another embodiment of the present invention. This embodiment is implemented based on the embodiment as shown in FIG. 6. As shown in FIG. 7, in this embodiment, the first sending module 61 is specifically configured to send a PDCCH and a PDSCH to the UE simultaneously, so as to realize the sending of the first data and the random access information to the UE simultaneously. Where, the PDCCH includes downlink scheduling information, and the PDSCH includes the first data, an identifier of the first data, the random access information and an identifier of the random access information.

The identifier of the first data and the identifier of the random access information are LCIDs. LCID values corresponding to the first data and the random access information respectively are different. In other words, the first sending module 61 will configure the identifier of the first data and the identifier of the random access information as LCIDs, and configures that LCID values corresponding to the first data and the random access information respectively are different.

Further, if the random access information only includes a dedicated preamble, then the first sending module 61 can specifically set a bit corresponding to a PRACH resource in the PDSCH to 0. Or, the first sending module 61 is specifically configured to send the PDSCH which does not include the bit corresponding to the PRACH resource, i.e. the PDSCH does not include the bit corresponding to the PRACH resource.

If the random access information only includes the PRACH resource, then the first sending module 61 can specifically set a bit corresponding to the dedicated preamble in the PDSCH to 0. Or, the first sending module 61 is specifically configured to send the PDSCH which does not include the bit corresponding to the dedicated preamble, i.e. the PDSCH does not include the bit corresponding to the dedicated preamble.

Further, the first sending module 61 can also be specifically configured to send a PDCCH and a PDSCH to the UE simultaneously, so as to realize the sending of the first data and the random access information to the UE simultaneously. Where, the PDCCH includes first indication information, downlink scheduling information and the random access information, the first indication information is used to indicate that the PDCCH carries the downlink scheduling information and the random access information simultaneously; and the PDSCH includes the first data and an identifier of the first data.

Further, the first sending module 61 can also be specifically configured to send a PDCCH to the UE, so as to realize the sending of the first data and the random access information to the UE simultaneously. Where, the PDCCH includes the first data and the random access information.

More specifically, the first sending module 61 can carry the first data by setting a value of at least one bit in the PDCCH as a preset value.

The first data can be data of a DRB, and can also be data of a SRB, e.g., a RRC release message.

The random access information sent by the base station can include a dedicated preamble and/or PRACH resource information. That is, the first sending module 61 is specifically configured to send to the UE the random access information which includes a dedicated preamble and/or PRACH resource information.

Base on the above, the acquiring module 62 is specifically configured to: if the dedicated preamble sent by the UE is received within a specified time, or any preambles sent by the UE on the PRACH resource are received, determine that the UE succeeds in receiving the first data; if, within a specified time, the dedicated preamble sent by the UE is not received or any preambles sent by the UE on the PRACH resource are not received, determine that the UE fails to receive the first data. Or, The acquiring module 62 can also be specifically configured to: determine that the UE succeeds in receiving the first data according to an ACK which is carried in the received dedicated preamble sent by the UE or in any received preambles sent by the UE on the PRACH resource; and determine that the UE fails to receive the first data according to a NACK which is carried in the received dedicated preamble sent by the UE or in any received preambles sent by the UE on the PRACH resource.

Further, the dedicated preamble can include a first preamble and a second preamble. Then the acquiring module 62 is specifically configured to: if the first preamble sent by the UE is received, determine that the UE succeeds in receiving the first data; if the second preamble sent by the UE is received, determine that the UE fails to receive the first data.

If the first data is a RRC release message, the first sending module 61 is specifically configured to send a RRC release message and the random access information to the UE simultaneously. Specifically, when sending the PDCCH and the PDSCH to the UE simultaneously, the first sending module 61 is further configured to carry second indication information in the PDSCH, where the second indication information is used to instruct the UE not to feed back a RLC status report to the base station after the RRC release message being received. Specifically, the first sending module 61 is specifically configured to carry the second indication information by setting a polling bit in a RLC PDU in the PDSCH to 0.

Further, the acquiring module 62 is further configured to: after it is determined that the UE fails to receive the first data, trigger the first sending module 61 to re-perform an operation of sending the first data and the random access information to the UE simultaneously, till the acquiring module 62 determines that the UE succeeds in receiving the first data or till the number of retransmission times reach a preset first maximum number of retransmission times.

Further, if the first data is a RRC release message, the base station in this embodiment can also include: a first releasing module 63.

The first releasing module 63 is connected to the acquiring module 62, and configured to release a RRC connection with the UE after the acquiring module 62 determines that the UE succeeds in receiving the first data, or after the number of the retransmission times reach the preset first maximum number of retransmission times.

Further, the first sending module 61 in this embodiment is further configured to send a random access response RAR to the UE after the dedicated preamble or any preamble sent by the UE are received by the acquiring module 62 so as to instruct the UE to perform an uplink synchronization.

Further, the first sending module 61 is further configured to send a RAR to the UE after the acquiring module 62 determines that the UE fails to receive the first data, so as to instruct the UE to perform an uplink synchronization.

Further, in order to ensure the reliability of transmission of a preamble by the UE, the first sending module 61 in this embodiment is further configured to carry maximum retransmission time or a second maximum number of retransmission times in the random access message, so as to instruct the UE to repeatedly send the dedicated preamble or any preamble till the number of retransmission times reach the second maximum number of retransmission times or till retransmission time reaches the maximum retransmission time.

Each of the functional modules above can be used to perform corresponding processes of embodiments as shown in FIG. 1, FIG. 3A, FIG. 4 or FIG. 5, specific operational principles thereof will not be repeated any more, please refer to descriptions on method embodiments for details.

In this embodiment, the base station can send first data and random access information to a UE simultaneously when the UE is in a state of uplink out of sync, transmission of service data to the UE is implemented during a random access procedure or prior to a random access procedure, rather than the as prior art where transmission is performed after a random access procedure, thereby signaling interaction and time delay are reduced, and data transmission efficiency is improved.

Figure 8:
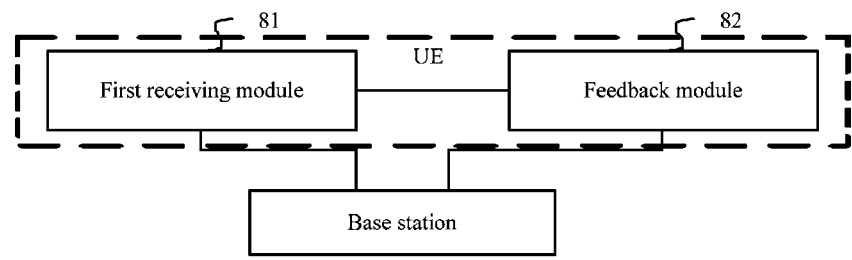
FIG. 8 is a schematic structural diagram of a UE provided by an embodiment of the present invention.

FIG. 8 is a schematic structural diagram of a UE provided by an embodiment of the present invention. As shown in FIG. 8, the UE of this embodiment includes: a first receiving module 81 and a feedback module 82.

The first receiving module 81 is connected to a base station and configured to receive first data and random access information sent by the base station simultaneously. The feedback module 82 is connected to the first receiving module 81 and the base station, and configured to feed back receiving state information of the first data to the base station through the random access information received by the first receiving module 81.

The first data can be data of a DRB, and can also be data of a SRB, e.g., a RRC release message.

The random access information sent by the base station can include a dedicated preamble and/or PRACH resource information, but is not limited thereto. Then the first receiving module 81 is specifically configured to receive the random access information which includes a dedicated preamble and/or a PRACH resource.

Each functional module of the UE in this embodiment can be used to perform a process of the data transmission method as shown in FIG. 2, specific operational principle thereof will not be repeated any more, please refer to descriptions on method embodiments for details.

When in an out of sync state, the UE in this embodiment, cooperating with the base station provided by embodiments of the present invention, can receive service data sent by the base station during a random access procedure or prior to a random access procedure, rather than as the prior art where service data can be received only after a random access procedure is ended, thereby signaling interaction and time delay are reduced, and data transmission efficiency is improved.

Figure 9:
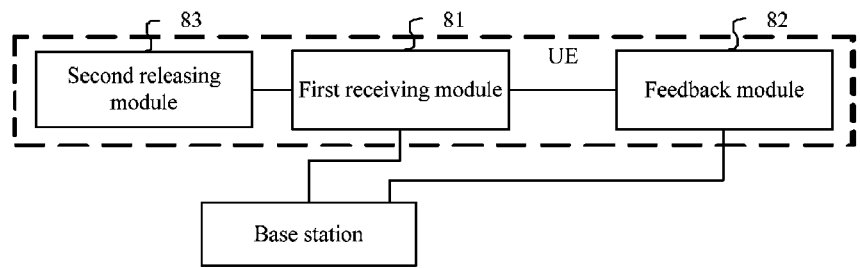
FIG. 9 is a schematic structural diagram of a UE provided by another embodiment of the present invention.

FIG. 9 is a schematic structural diagram of a UE provided by another embodiment of the present invention. This embodiment is implemented based on the embodiment as shown in FIG. 8. As shown in FIG. 9, the first receiving module 81 in this embodiment can be specifically configured to receive simultaneously a PDCCH and a PDSCH sent by the base station, so as to realize the purpose of receiving the random access information and the first data simultaneously. The PDCCH includes downlink scheduling information, and the PDSCH includes the first data, an identifier of the first data, the random access information and an identifier of the random access information.

Based on the operational principle of the first receiving module 81 above, the feedback module 82 can be specifically configured to: parse the PDSCH according to the downlink scheduling information in the PDCCH; if the random access information and the first data are parsed out from the PDSCH, send the dedicated preamble to the base station, or send any preamble to the base station on the PRACH resource, so as to feed back to the base station a success in receiving the first data; if the first data is not parsed out from the PDSCH, not perform an operation of sending a preamble to the base station, so as to feed back to the base station a failure in receiving the first data.

Or, the first receiving module 81 in this embodiment can also be specifically configured to receive simultaneously a PDCCH and a PDSCH sent by the base station, so as to realize the purpose of receiving the random access information and the first data simultaneously. The PDCCH includes first indication information, downlink scheduling information and the random access information, the first indication information is used to indicate that the PDCCH carries downlink scheduling information and the random access information simultaneously. The PDSCH includes the first data and an identifier of the first data.

Based on the operational principle of the first receiving module 81 above, the feedback module 82 can be specifically configured to: acquire the downlink scheduling information and the random access information from the PDCCH according to the first indication information; and then parse the PDSCH according to the downlink scheduling information; if the first data is parsed out from the PDSCH, send the dedicated preamble to the base station, or send any preamble to the base station on the PRACH resource, or send the dedicated preamble which carries an ACK to the base station, or send any preamble which carries the ACK to the base station on the PRACH resource so as to feed back to the base station a success in receiving the first data; if the first data is not parsed out from the PDSCH, not perform an operation of sending a preamble to the base station, or send the dedicated preamble which carries a NACK to the base station, or send any preamble which carries the NACK to the base station on the PRACH resource so as to feed back to the base station a failure in receiving the first data.

Further, the dedicated preamble may include a first preamble and a second preamble.

Based on this, the feedback module 82 can also be specifically configured to: acquire the downlink scheduling information and the random access information from the PDCCH according to the first indication information; and then parse the PDSCH according to the downlink scheduling information; if the first data is parsed out from the PDSCH, send the first preamble to the base station so as to feed back to the base station a success in receiving the first data; if the first data is not parsed out from the PDSCH, send the second preamble to the base station so as to feed back to the base station a failure in receiving the first data.

Or, the first receiving module 81 in this embodiment can also be specifically configured to receive a PDCCH sent by the base station. The PDCCH includes the first data and the random access information.

Based on the operational principle of the first receiving module 81 above, the feedback module 82 can be specifically configured to: parse the PDCCH; if the first data and the random access information are parsed out from the PDCCH, send the dedicated preamble to the base station, or send any preamble to the base station on the PRACH resource, or send the dedicated preamble which carries an ACK to the base station, or send any preamble which carries the ACK to the base station on the PRACH resource so as to feed back to the base station a success in receiving the first data.

The first data can be a RRC release message, then the first receiving module 81 is specifically configured to receive a RRC release message and the random access information sent by the base station simultaneously. Moreover, based on this, the UE in this embodiment also includes: a second releasing module 83.

The second releasing module 83 is configured to, according to a second indication information in the PDSCH received by the first receiving module 81, not feed back a radio link control RLC status report to the base station after the RRC release message being acquired, directly disconnect a RRC connection with the base station. The second indication information is configured to instruct the UE not to feed back the RLC status report to the base station after the RRC release message being received.

Further, the first receiving module 81 in this embodiment is further configured to receive a RAR sent by the base station, and perform an uplink synchronization. Preferably, the first receiving module 81 is further configured to receive a RAR sent by the base station after it being determined that the UE fails to receive the first data, so as to facilitate a normal feedback by the UE after the base station resends the first data.

Furthermore, the feedback module 82 is also specifically configured to send the dedicated preamble to the base station repeatedly, or send any preambles to the base station on the PRACH resource repeatedly till the number of retransmission times reaches a second maximum number of retransmission times or till retransmission time reaches maximum retransmission time.

The second maximum number of retransmission times or the maximum retransmission time can by fixed by a protocol or configured by a high layer or carried by the random access information.

If the second maximum number of retransmission times or the maximum retransmission time is carried by the random access information, then the feedback module 82 is further configured to acquire the maximum retransmission time or the second maximum number of retransmission times from a random access message.

The functional modules above can be used to perform corresponding processes of embodiments as shown in FIG. 2, FIG. 3A, FIG. 4 or FIG. 5, specific operational principles thereof will not be repeated any more, please refer to descriptions on method embodiments for details.

When in out of sync state, the UE in this embodiment, cooperating with the base station provided by embodiments of the present invention, can receive service data sent by the base station during a random access procedure or prior to a random access procedure, rather than as the prior art where service data can be received only after a random access procedure is ended, thereby signaling interaction and time delay are reduced, and data transmission efficiency is improved.

Persons skilled in the art can understand that all or a part of the steps of each of the foregoing method embodiments may be implemented by a program instructing relevant hardware, where, the program may be stored in a computer readable storage medium. When the program is executed, the steps of each of the foregoing method embodiments are performed; the storage medium described above includes: the media of a ROM, a RAM, a magnetic disk, or a optical disk, and the like, which may store a program code.

Finally, it should be noted: each of the foregoing embodiments is merely used to illustrate the technical solutions of the present invention, and should not be interpreted as a limitation thereto; although detailed descriptions are given to the present invention with reference to each of the foregoing embodiments, persons of ordinary skill in the art should understand: they can still make modifications to the technical solutions recited in each embodiment described above, or make equivalent replacements to a part of or all the technical features therein; while these modifications or replacements do not make the nature of corresponding technical solutions depart from the scope of embodiments of the present invention.

What is claimed is:

1. A data transmission method, comprising:
sending, by a base station, first data and random access information to a user equipment (UE) simultaneously, wherein the UE is in a state of uplink out of sync, wherein the first data comprises data of a data radio bearer (DRB) or data of a signaling radio bearer (SRB), and wherein the random access information comprises at least one of a dedicated preamble and physical random access channel (PRACH) resource information; and
acquiring, by the base station, receiving state information of the first data, wherein the receiving state information is fed back by the UE through a first preamble, wherein the first preamble comprises the dedicated preamble in a case of the random access information comprising the dedicated preamble, and the first preamble comprises any preamble in a case of the random access information comprising the PRACH resource information.

2. The data transmission method according to claim 1, wherein sending, by the base station, the first data and the random access information to the UE simultaneously, comprises:
sending, by the base station, a physical downlink control channel (PDCCH) and a physical downlink shared channel (PDSCH), to the UE simultaneously, wherein the PDCCH comprises downlink scheduling information, and the PDSCH comprises the first data, an identifier of the first data, the random access information and an identifier of the random access information;
or,
sending, by the base station, a physical downlink control channel (PDCCH) and a physical downlink shared channel (PDSCH) to the UE simultaneously, wherein the PDCCH comprises first indication information, downlink scheduling information and the random access information, the first indication information is used to indicate that the PDCCH carries the downlink scheduling information and the random access information simultaneously; and the PDSCH comprises the first data and an identifier of the first data;
or,
sending, by the base station, a physical downlink control channel (PDCCH) to the UE;
and the PDCCH comprising the first data and the random access information.

3. The data transmission method according to claim 2, wherein:
acquiring, by the base station, the receiving state information of the first data fed back by the UE through the first preamble comprises:

if, within a specified time, the base station receives the dedicated preamble sent by the UE, or receives any preamble sent by the UE on the PRACH resource, determining that the UE succeeds in receiving the first data; or if, within the specified time, the base station fails to receive the dedicated preamble sent by the UE, or fails to receive any preamble sent by the UE on the PRACH resource, determining that the UE fails to receive the first data;

or, acquiring, by the base station, the receiving state information of the first data fed back by the UE through the first preamble, comprises:

determining, by the base station, that the UE succeeds in receiving the first data according to an acknowledgement (ACK) which is carried in the received dedicated preamble sent by the UE or in any received preamble sent by the UE on the PRACH resource; or determining, by the base station, that the UE fails to receive the first data according to a negative acknowledgement (NACK) which is carried in the received dedicated preamble sent by the UE or in any received preamble sent by the UE on the PRACH resource.

4. A data transmission method, comprising:

receiving, by a user equipment (UE) that is in a state of uplink out of sync first data and random access information sent by a base station simultaneously, wherein the first data comprises data of a data radio bearer (DRB) or data of a signaling radio bearer (SRB), and wherein the random access information comprises at least one of a dedicated preamble and physical random access channel (PRACH) resource information; and feeding back, by the UE, receiving state information of the first data to the base station through a first preamble, wherein the first preamble comprises the dedicated preamble in a case of the random access information comprising the dedicated preamble, and the first preamble comprises any preamble in a case of the random access information comprising the PRACH resource information.

5. The data transmission method according to claim 4, wherein receiving, by the UE, the first data and the random access information sent by the base station simultaneously, comprises:

receiving, by the UE simultaneously, a physical downlink control channel (PDCCH) and a physical downlink shared channel (PDSCH) sent by the base station, wherein the PDCCH comprises downlink scheduling information, and the PDSCH comprises the first data, an identifier of the first data, the random access information and an identifier of the random access information.

6. The data transmission method according to claim 5, wherein feeding back, by the UE, the receiving state information of the first data to the base station through the first preamble comprises:

parsing, by the UE, the PDSCH according to the downlink scheduling information in the PDCCH;

in response to the UE parsing out the random access information and the first data from the PDSCH, sending, by the UE, the dedicated preamble to the base station, or sending any preamble to the base station on the PRACH resource, so as to feed back to the base station a success in receiving the first data; and in response to the UE failing to parse out the first data from the PDSCH, not performing, by the UE, an operation of sending a preamble to the base station, so as to feed back to the base station a failure in receiving the first data.

7. The data transmission method according to claim 4, wherein receiving, by the user equipment UE, the first data and the random access information sent by the base station simultaneously, comprises:

receiving, by the UE simultaneously, a physical downlink control channel (PDCCH) and a physical downlink shared channel (PDSCH) sent by the base station, wherein the PDCCH comprises first indication information, downlink scheduling information and the random access information, the first indication information is used to indicate that the PDCCH carries the downlink scheduling information and the random access information simultaneously; and the PDSCH comprises the first data and an identifier of the first data.

8. The data transmission method according to claim 7, wherein feeding back, by the UE, the receiving state information of the first data to the base station through the first preamble comprises:

acquiring, by the UE, the downlink scheduling information and the random access information from the PDCCH according to the first indication information;

parsing, by the UE, the PDSCH according to the downlink scheduling information;

in response to the UE parsing out the first data from the PDSCH, sending, by the UE, the dedicated preamble to the base station, or sending any preamble to the base station on the PRACH resource, or sending the dedicated preamble which carries an acknowledgement (ACK) to the base station, or sending any preamble which carries the ACK to the base station on the PRACH resource so as to feed back to the base station a success in receiving the first data; and in response to the UE failing to parse out the first data from the PDSCH, not performing, by the UE, an operation of sending a preamble to the base station, or sending the dedicated preamble which carries a negative acknowledgement (NACK) to the base station, or sending any preamble which carries the NACK to the base station on the PRACH resource, so as to feed back to the base station a failure in receiving the first data.

9. The data transmission method according to claim 4, wherein the receiving, by the UE, the first data and the random access information sent by the base station simultaneously, comprises:

receiving, by the UE, a physical downlink control channel (PDCCH) sent by the base station, wherein the PDCCH comprises the first data and the random access information.

10. The data transmission method according to claim 9, wherein feeding back, by the UE, the receiving state information of the first data to the base station through the first preamble comprises:

parsing, by the UE, the PDCCH; and in response to the UE parsing out the first data and the random access information from the PDCCH, sending, by the UE, the dedicated preamble to the base station, or sending any preamble to the base station on the PRACH resource, or sending the dedicated preamble which carries an ACK to the base station, or sending any preamble which carries the ACK to the base station on the PRACH resource, so as to feed back to the base station a success in receiving the first data.

11. A base station, comprising:
a memory storing a computer program; and
processing hardware configured to execute the computer program to cause the base station to:
- send first data and random access information to a user equipment (UE) simultaneously wherein the UE is in a state of uplink out of sync, wherein the first data comprises data of a data radio bearer (DRB) or data of a signaling radio bearer (SRB), and wherein the random access information comprises at least one of a dedicated preamble and physical random access channel (PRACH) resource information; and
- acquire receiving state information of the first data, wherein the receiving state information is fed back by the UE through a first preamble, wherein the first preamble comprises the dedicated preamble in a case of the random access information comprising the dedicated preamble, and the first preamble comprises any preamble in a case of the random access information comprising the PRACH resource information.

12. The base station according to claim 11, wherein:
a physical downlink control channel (PDCCH) and a physical downlink shared channel (PDSCH) are sent to the UE simultaneously, wherein the PDCCH comprises downlink scheduling information, and the PDSCH comprises the first data, an identifier of the first data, the random access information and an identifier of the random access information;
or,
a physical downlink control channel, PDCCH and a physical downlink shared channel (PDSCH) are sent to the UE simultaneously, wherein the PDCCH comprises first indication information, downlink scheduling information and the random access information, the first indication information is used to indicate that the PDCCH carries the downlink scheduling information and the random access information simultaneously; and the PDSCH comprises the first data and an identifier of the first data;
or,
a physical downlink control channel (PDCCH) is sent to the UE, wherein the PDCCH comprises the first data and the random access information.

13. The base station according to claim 12, wherein the processing hardware is further configured to:
if, within a specified time, the dedicated preamble sent by the UE is received, or any preamble sent by the UE on the PRACH resource is received, determine that the UE succeeds in receiving the first data; if, within the specified time, the dedicated preamble sent by the UE is not received, or any preamble sent by the UE on the PRACH resource is not received, determine that the UE fails to receive the first data; or
determine that the UE succeeds in receiving the first data according to an acknowledgement (ACK) which is carried in the received dedicated preamble sent by the UE or in any received preamble sent by the UE on the PRACH resource; and determine that the UE fails to receive the first data according to a negative acknowledgement (NACK) which is carried in the received dedicated preamble sent by the UE or in any received preamble sent by the UE on the PRACH resource.

14. A user equipment (UE), comprising:
a memory storing a computer program and
processing hardware configured to execute the computer program to cause the UE to:
- receive first data and random access information sent by a base station simultaneously, wherein the UE is in a state of uplink out of sync, wherein the first data comprises data of a data radio bearer (DRB) or data of a signaling radio bearer (SRB), and wherein the random access information comprises at least one of a dedicated preamble and physical random access channel (PRACH) resource information; and
- feed back receiving state information of the first data to the base station through a first preamble, wherein the first preamble comprises the dedicated preamble in a case of the random access information comprising the dedicated preamble, and the first preamble comprises any preamble in a case of the random access information comprising the PRACH resource information.

15. The UE according to claim 14, wherein the UE is configured to receive simultaneously a physical downlink control channel (PDCCH), and a physical downlink shared channel (PDSCH) sent by the base station, wherein the PDCCH comprises downlink scheduling information, and the PDSCH comprises the first data, an identifier of the first data, the random access information and an identifier of the random access information.

16. The UE according to claim 15, wherein the processing hardware is configured to:
parse the PDSCH according to the downlink scheduling information in the PDCCH;
if the random access information and the first data are parsed out from the PDSCH, send the dedicated preamble to the base station, or send any preamble to the base station on the PRACH resource, so as to feed back to the base station a success in receiving the first data; and
if the first data is not parsed out from the PDSCH, not perform an operation of sending a preamble to the base station, so as to feed back to the base station a failure in receiving the first data.

17. The UE according to claim 14, wherein the UE is configured to receive simultaneously a physical downlink control channel (PDCCH), and a physical downlink shared channel (PDSCH) sent by the base station, wherein the PDCCH comprises first indication information, downlink scheduling information and the random access information, wherein the first indication information is used to indicate that the PDCCH carries the downlink scheduling information and the random access information simultaneously; and the PDSCH comprises the first data and an identifier of the first data.

18. The UE according to claim 17, wherein the processing hardware is configured to:
acquire the downlink scheduling information and the random access information from the PDCCH according to the first indication information, and then parse the PDSCH according to the downlink scheduling information;
if the first data is parsed out from the PDSCH, send the dedicated preamble to the base station, or send any preamble to the base station on the PRACH resource, or send the dedicated preamble which carries an acknowledgement (ACK) to the base station, or send any preamble which carries the ACK to the base station on the PRACH resource, so as to feed back to the base station a success in receiving the first data;
if the first data is not parsed out from the PDSCH, not perform an operation of sending a preamble to the base station, or send the dedicated preamble which carries a negative acknowledgement (NACK) to the base station, or send any preamble which carries the NACK to the base station on the PRACH resource, so as to feed back to the base station a failure in receiving the first data.

19. The UE according to claim 14, wherein the UE is configured to receive a physical downlink control channel (PDCCH) sent by the base station; and wherein the PDCCH comprises the first data and the random access information.

20. The UE according to claim 19, wherein the processing hardware is configured to:

parse the PDCCH;

if the first data and the random access information are parsed out from the PDCCH, send the dedicated preamble to the base station, or send any preamble to the base station on the PRACH resource, or send the dedicated preamble which carries an ACK to the base station, or send any preamble which carries the ACK to the base station on the PRACH resource, so as to feed back to the base station a success in receiving the first data.

* * * * *